United States Patent
Kim

(10) Patent No.: US 8,091,252 B2
(45) Date of Patent: Jan. 10, 2012

(54) METHOD OF CONTROLLING GAS VALVE OF DRYER

(75) Inventor: Chang Hoo Kim, Incheon (KR)

(73) Assignee: Daewoo Electronics Corporation, Seoul (KR)

( * ) Notice: Subject to any disclaimer, the term of this patent is extended or adjusted under 35 U.S.C. 154(b) by 259 days.

(21) Appl. No.: 12/490,700

(22) Filed: Jun. 24, 2009

(65) Prior Publication Data

US 2009/0320927 A1    Dec. 31, 2009

(30) Foreign Application Priority Data

Jun. 27, 2008   (KR) .................. 10-2008-0061335

(51) Int. Cl.
*F26B 13/08* (2006.01)

(52) U.S. Cl. .............. 34/381; 34/413; 34/497; 137/2; 432/14

(58) Field of Classification Search ............ 34/359, 34/380, 381, 413, 497, 524, 80; 137/2; 432/14
See application file for complete search history.

(56) References Cited

U.S. PATENT DOCUMENTS

| | | | | |
|---|---|---|---|---|
| 3,971,639 A * | 7/1976 | Matthews | ............ | 48/202 |
| 4,146,361 A * | 3/1979 | Cirrito | ............ | 432/60 |
| 4,159,306 A * | 6/1979 | Borst | ............ | 422/210 |
| 4,163,469 A * | 8/1979 | English | ............ | 165/297 |
| 4,168,580 A * | 9/1979 | Weinmann | ............ | 34/122 |
| 4,177,575 A * | 12/1979 | Brooks | ............ | 34/392 |
| 4,179,265 A * | 12/1979 | Gildersleeve | ............ | 432/36 |
| 4,207,056 A * | 6/1980 | Bowley | ............ | 432/3 |
| 4,207,290 A * | 6/1980 | Lee | ............ | 422/109 |
| 4,221,570 A * | 9/1980 | Wasson | ............ | 44/551 |
| 4,240,209 A * | 12/1980 | Cuthbertson et al. | ............ | 34/363 |
| 4,242,084 A * | 12/1980 | Jamaluddin | ............ | 432/1 |
| 4,254,557 A * | 3/1981 | Mayer et al. | ............ | 34/249 |
| 4,254,558 A * | 3/1981 | Mayer | ............ | 34/249 |
| 4,254,616 A * | 3/1981 | Siminski et al. | ............ | 60/39.12 |
| 4,255,129 A * | 3/1981 | Reed et al. | ............ | 432/13 |
| 4,255,166 A * | 3/1981 | Gernand et al. | ............ | 95/27 |
| 4,255,403 A * | 3/1981 | Mayer et al. | ............ | 423/244.06 |
| 4,256,944 A * | 3/1981 | Brandon | ............ | 219/686 |
| 4,258,476 A * | 3/1981 | Caughey | ............ | 34/174 |
| 4,260,373 A * | 4/1981 | Fellnor et al. | ............ | 432/110 |
| 4,268,247 A * | 5/1981 | Freze | ............ | 432/21 |
| 4,275,705 A * | 6/1981 | Schaus et al. | ............ | 126/110 R |
| 4,282,199 A * | 8/1981 | Lamond et al. | ............ | 423/461 |
| 4,285,773 A * | 8/1981 | Taciuk | ............ | 202/100 |
| 4,300,837 A * | 11/1981 | Malbrunot | ............ | 366/25 |
| 4,309,168 A * | 1/1982 | Prill et al. | ............ | 432/24 |
| 4,312,135 A * | 1/1982 | Devanney, III | ............ | 34/359 |
| 4,312,302 A * | 1/1982 | Kollerup | ............ | 122/4 D |

(Continued)

FOREIGN PATENT DOCUMENTS

DE    3911388 A1 *   5/1990

(Continued)

*Primary Examiner* — Stephen M. Gravini

(74) *Attorney, Agent, or Firm* — Occhiuti Rohlicek & Tsao LLP

(57) ABSTRACT

Disclosed herein is a method of controlling a gas valve of a dryer which controls the amount of gas supplied into a gas combustor. The method includes detecting the temperature of hot air supplied into a drum, detecting the temperature of the hot air discharged outside the drum, and controlling a gas valve of a gas combustor according to the temperature of the hot air supplied into the drum and the temperature of the hot air discharged outside the drum.

8 Claims, 2 Drawing Sheets

U.S. PATENT DOCUMENTS

| | | | | |
|---|---|---|---|---|
| 4,313,723 A * | 2/1982 | Kallenberger et al. | 432/37 |
| 4,314,967 A * | 2/1982 | Kwon et al. | 422/49 |
| 4,319,410 A * | 3/1982 | Heilhecker et al. | 34/75 |
| 4,320,585 A * | 3/1982 | Duperret | 34/66 |
| 4,334,366 A * | 6/1982 | Lockwood | 34/425 |
| 4,354,317 A * | 10/1982 | Mathis et al. | 34/499 |
| 4,356,162 A * | 10/1982 | Lumbeck et al. | 423/600 |
| 4,375,959 A * | 3/1983 | Powell | 432/223 |
| 4,401,436 A * | 8/1983 | Bonnecaze | 44/501 |
| 4,402,706 A * | 9/1983 | Wunderlich | 44/501 |
| 4,420,302 A * | 12/1983 | Knudsen | 432/14 |
| 4,420,303 A * | 12/1983 | Knudsen | 432/14 |
| 4,424,021 A * | 1/1984 | Merrill, Jr. | 432/14 |
| 4,430,094 A * | 2/1984 | Gorzegno | 48/76 |
| 4,434,014 A * | 2/1984 | Smith | 148/549 |
| 4,439,141 A * | 3/1984 | Deckebach | 432/14 |
| 4,439,533 A * | 3/1984 | Lomas et al. | 502/6 |
| 4,445,976 A * | 5/1984 | LaDelfa et al. | 201/41 |
| 4,449,483 A * | 5/1984 | Strohmeyer, Jr. | 122/4 D |
| 4,451,231 A * | 5/1984 | Murray | 432/13 |
| 4,455,762 A * | 6/1984 | Saeman | 34/170 |
| 4,458,428 A * | 7/1984 | Saeman | 34/506 |
| 4,460,558 A * | 7/1984 | Johnson | 423/450 |
| 4,462,868 A * | 7/1984 | Oubridge et al. | 162/280 |
| 4,477,984 A * | 10/1984 | Wenger | 34/128 |
| 4,480,392 A * | 11/1984 | Luthi | 34/368 |
| 4,481,722 A * | 11/1984 | Guy et al. | 34/535 |
| 4,492,043 A * | 1/1985 | Zannoni | 34/520 |
| 4,494,930 A * | 1/1985 | Bauer et al. | 432/95 |
| 4,502,227 A * | 3/1985 | Janusch | 34/380 |
| 4,505,230 A * | 3/1985 | Caplin | 122/4 D |
| 4,507,080 A * | 3/1985 | Freze | 432/105 |
| 4,529,497 A * | 7/1985 | Watson et al. | 208/419 |
| 4,530,700 A * | 7/1985 | Sawyer et al. | 44/606 |
| 4,558,523 A * | 12/1985 | Isbell et al. | 34/491 |
| 4,559,720 A * | 12/1985 | Marquardt | 34/137 |
| 4,563,315 A * | 1/1986 | Walter et al. | 264/8 |
| 4,564,505 A * | 1/1986 | Alfrey | 422/209 |
| 4,583,468 A * | 4/1986 | Reed et al. | 110/246 |
| 4,594,793 A * | 6/1986 | Carlson | 34/371 |
| 4,601,113 A * | 7/1986 | Draper et al. | 34/359 |
| 4,619,732 A * | 10/1986 | Clay et al. | 162/29 |
| 4,627,173 A * | 12/1986 | O'Hagan et al. | 34/369 |
| 4,628,833 A * | 12/1986 | O'Hagan et al. | 110/263 |
| 4,640,683 A * | 2/1987 | Mori | 432/134 |
| 4,643,108 A * | 2/1987 | Singelyn et al. | 110/228 |
| 4,649,655 A * | 3/1987 | Witten | 34/135 |
| 4,665,628 A * | 5/1987 | Clawson | 34/449 |
| 4,668,244 A * | 5/1987 | Nakamura et al. | 44/591 |
| 4,669,199 A * | 6/1987 | Clawson et al. | 34/82 |
| 4,683,664 A * | 8/1987 | Codenotti | 34/479 |
| 4,685,220 A * | 8/1987 | Meenan et al. | 588/320 |
| 4,689,896 A * | 9/1987 | Narang | 34/82 |
| 4,696,690 A * | 9/1987 | Roloff | 65/27 |
| 4,704,805 A * | 11/1987 | Kaya et al. | 34/483 |
| 4,710,126 A * | 12/1987 | Areaux et al. | 432/58 |
| 4,710,271 A * | 12/1987 | Miller | 162/360.3 |
| 4,715,965 A * | 12/1987 | Sigerson et al. | 210/511 |
| 4,721,457 A * | 1/1988 | Areaux et al. | 432/58 |
| 4,728,289 A * | 3/1988 | Samera, Jr. | 432/115 |
| 4,729,176 A * | 3/1988 | Shinn et al. | 34/389 |
| 4,756,092 A * | 7/1988 | Anderson et al. | 34/424 |
| 4,758,310 A * | 7/1988 | Miller | 162/358.5 |
| 4,760,650 A * | 8/1988 | Theliander et al. | 34/513 |
| 4,761,162 A * | 8/1988 | Ratcliffe et al. | 44/626 |
| 4,778,606 A * | 10/1988 | Meenan et al. | 210/771 |
| 4,781,795 A * | 11/1988 | Miller | 162/358.5 |
| 4,781,933 A * | 11/1988 | Fraioli | 426/242 |
| 4,787,323 A * | 11/1988 | Beer et al. | 110/346 |
| 4,793,937 A * | 12/1988 | Meenan et al. | 210/771 |
| 4,802,288 A * | 2/1989 | Shinn et al. | 34/136 |
| 4,841,645 A * | 6/1989 | Bettcher et al. | 34/78 |
| 4,888,884 A * | 12/1989 | Bartling et al. | 34/479 |
| 4,891,892 A * | 1/1990 | Narang | 34/86 |
| 4,894,930 A * | 1/1990 | Shinn | 34/136 |
| 4,912,914 A * | 4/1990 | Wingard | 56/16.4 B |
| 4,932,785 A * | 6/1990 | Bracegirdle | 366/7 |
| 5,090,813 A * | 2/1992 | McFarland et al. | 366/23 |
| 5,174,650 A * | 12/1992 | McFarland et al. | 366/23 |
| 5,301,619 A * | 4/1994 | Keersmaekers | 110/246 |
| 5,318,672 A * | 6/1994 | Losel | 201/10 |
| 5,322,367 A * | 6/1994 | Nath et al. | 366/7 |
| 5,497,712 A * | 3/1996 | May et al. | 110/342 |
| 5,851,361 A * | 12/1998 | Hogan | 202/136 |
| 5,876,683 A * | 3/1999 | Glumac et al. | 423/325 |
| 6,185,842 B1* | 2/2001 | Brashears | 34/369 |
| 6,269,626 B1* | 8/2001 | Kim | 60/39.182 |
| 7,357,562 B2* | 4/2008 | Hawkins | 366/23 |
| 7,581,871 B2* | 9/2009 | Hawkins | 366/7 |
| 7,814,867 B2* | 10/2010 | Betzer Tsilevich | 122/11 |
| 2004/0179422 A1* | 9/2004 | Hawkins | 366/7 |
| 2008/0031080 A1* | 2/2008 | Hawkins | 366/4 |
| 2009/0211539 A1* | 8/2009 | Tsilevich | 122/11 |
| 2009/0320927 A1* | 12/2009 | Kim | 137/2 |

FOREIGN PATENT DOCUMENTS

| | | | |
|---|---|---|---|
| DE | 4309608 A1 * | 9/1994 |
| EP | 544373 A1 * | 6/1993 |
| EP | 632242 A1 * | 1/1995 |
| EP | 706845 A1 * | 4/1996 |
| EP | 836051 A2 * | 4/1998 |
| EP | 860657 A2 * | 8/1998 |
| FR | 2763324 A1 * | 11/1998 |
| GB | 2084482 A * | 4/1982 |
| JP | 54084890 A * | 7/1979 |
| JP | 54117503 A * | 9/1979 |
| JP | 55085359 A * | 6/1980 |
| JP | 55099523 A * | 7/1980 |
| JP | 55155119 A * | 12/1980 |
| JP | 56061515 A * | 5/1981 |
| JP | 56068719 A * | 6/1981 |
| JP | 57027113 A * | 2/1982 |
| JP | 57063387 A * | 4/1982 |
| WO | WO 9526242 A1 * | 10/1995 |
| WO | WO 9634119 A1 * | 10/1996 |

* cited by examiner

METHOD OF CONTROLLING GAS VALVE OF DRYER

CROSS-REFERENCE TO RELATED APPLICATIONS

The present application claims priority to Korean patent application number 10-2008-0061335, filed on Jun. 27, 2008, which is incorporated by reference in its entirety.

BACKGROUND OF THE INVENTION

1. Field of the Invention

The present invention relates to a method of controlling a gas valve of a dryer. More particularly, the present invention relates to a method of controlling a gas valve of a dryer that controls the amount of gas supplied into a gas combustor.

2. Description of the Related Art

Dryers refer to a device for drying laundry such as clothes and the like, and generally dry the laundry by supplying hot air into a drum which is rotated in the dryer. The hot air is generated by burning a gas supplied into a gas combustor through gas valves.

In the dryer, the hot air absorbs moisture, which is then discharged outside the drum, from the laundry.

A conventional dryer is provided with gas valves to control gas supply. The gas valves are on/off-solenoid valves which are provided to control a supply amount of gas by controlling an on/off time in order to maintain a drying temperature. In other words, the gas amount is controlled by controlling an on/off duty ratio of the gas valves.

Here, it should be noted that the aforementioned technique is given not for illustration of a well-known conventional technique to which the present invention pertains, but for illustration of the background art of the present invention.

In the conventional dryer, since the gas supply amount is controlled merely based on an inner temperature of the drum, laundry located near a hot-air supply port of the dryer can be damaged by hot air when the hot air directly contacts the laundry.

Further, since the gas supply amount is controlled by controlling the duty ratio according to the inner temperature of the drum, it is difficult to control the heat amount of the dryer.

SUMMARY OF THE INVENTION

The present invention is conceived to solve the problems as described above, and an aspect of the present invention is to provide a method of controlling a gas valve of a dryer that can adjust the amount of gas supplied into a gas combustor by controlling a proportional control valve according to temperatures of inlet and outlet of a drum.

In accordance with one aspect of the present invention, a method of controlling a gas valve of a dryer includes detecting temperature of hot air supplied into a drum; detecting the temperature of the hot air discharged outside the drum; and controlling a gas valve of a gas combustor according to the temperature of the hot air supplied into the drum and the temperature of the hot air discharged outside the drum.

The gas valve may proportionally control an amount of gas.

When the temperature of the hot air supplied into the drum is greater than or equal to an inlet control temperature and the temperature of the hot air discharged outside the drum is less than a valve-closing control temperature, an open degree of the gas valve may be lowered.

Whenever the temperature of the hot air supplied into the drum is greater than or equal to the inlet control temperature and the temperature of the hot air discharged outside the drum is less than the valve-closing control temperature, an open degree of the gas valve may be lowered by a preset step at each time and then maintained for a retardation time.

When the temperature of the hot air supplied into the drum is greater than or equal to the inlet control temperature and the temperature of the hot air discharged outside the drum is greater than or equal to the valve-closing control temperature, the gas valve may be turned-off.

When the temperature of the hot air discharged outside the drum is less than or equal to a valve-opening control temperature after the gas valve is turned-off, the gas valve may be turned-on.

The gas valve may be open to a final open degree at the time of turning-off the gas valve.

When the temperature of the hot air discharged outside the drum is greater than or equal to the valve-closing control temperature, the gas valve may be turned-off.

When the temperature of the hot air discharged outside the drum is less than or equal to a valve-opening control temperature after the gas valve is turned-off, the gas valve may be turned-on.

The gas valve may be open to a final open degree at the time of turning-off the gas valve.

BRIEF DESCRIPTION OF THE DRAWINGS

The above and other aspects, features and advantages of the present invention will become apparent from the following detailed description in conjunction with the accompanying drawings, in which.

DETAILED DESCRIPTION OF THE EMBODIMENT

Hereinafter, exemplary embodiments of the present invention will be described in detail with reference to the accompanying drawings.

It should be noted that the drawings are not to precise scale and may be exaggerated in thickness of lines or size of components for descriptive convenience and clarity. Furthermore, the terms as used herein are defined by taking functions of the present invention into account and can be changed according to the custom or intention of users or operators. Therefore, definition of the terms should be made according to the overall disclosures set forth herein.

Figure 1:
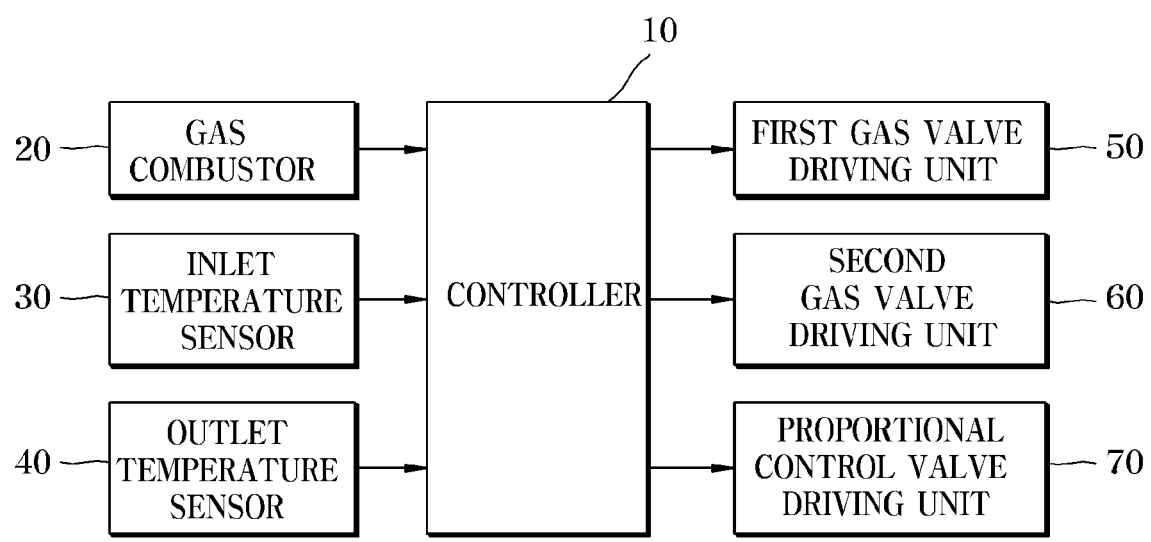
FIG. 1 is a block diagram of a gas valve control device of a dryer according to one embodiment of the present invention.

FIG. 1 is a block diagram of a gas valve control device of a dryer according to one embodiment of the present invention.

In the dryer according to one embodiment of the invention, the gas valve control device includes a gas combustor 20 which burns a gas supplied from a gas nozzle (not shown); an inlet temperature sensor 30 which detects the temperature of hot air supplied into a drum (not shown) through an inlet; an outlet temperature sensor 40 which detects the temperature of the hot air discharged from the drum through an outlet; valve driving units 50, 60, 70 which operate gas valves to adjust the amount of gas supplied into the gas combustor 20; and a controller 10 which controls the valve driving units 50, 60, 70 according to the temperatures detected by the inlet and the outlet temperature sensors 30, 40 to adjust the amount of gas supplied into the gas combustor 20 and which controls the gas combustor 20 to heat air by burning the gas in order to supply hot air.

Particularly, the valve driving units 50, 60, 70 serve to adjust the amount of gas supplied into the gas combustor 20, and include a first gas valve driving unit 50 driving a first gas valve (not shown) which opens or closes a passageway for supplying a gas into the gas combustor 20, a second gas valve driving unit 60 driving a second gas valve (not shown) which opens or closes the passageway for supplying the gas into the gas combustor 20, and a proportional control valve 70 driving a proportional control valve (not shown) which proportionally controls the amount of gas supplied into the gas combustor 20.

For reference, the dryer is provided with gas valves for adjusting the amount of gas supplied into the gas combustor 20, and generally includes two gas valves for security. Therefore, the gas valve of the dryer according to this embodiment is also divided into first and second gas valves in the specification of the present invention.

Thus, the gas valve of the dryer according to this embodiment will be illustrated as comprising a first gas valve, a second gas valve, and a proportional control valve.

However, it should be noted that the present invention is not limited to this configuration and may include at least one gas valve.

Figure 2:
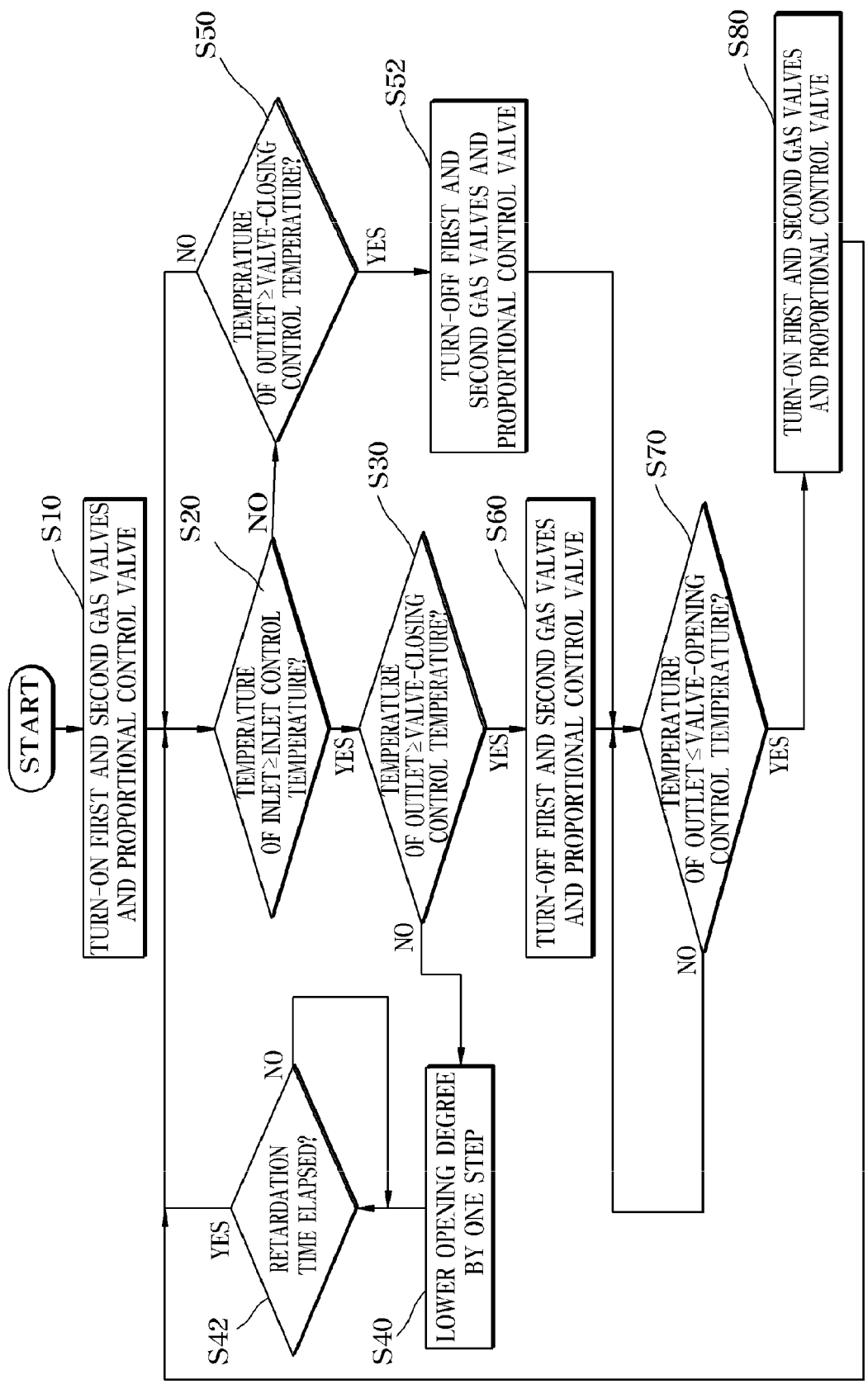
FIG. 2 is a flowchart of a method of controlling a gas valve of a dryer according to one embodiment of the present invention.

FIG. 2 is a flowchart of a method of controlling a gas valve of a dryer according to one embodiment of the present invention.

In the method of controlling the gas valve of the dryer according to this embodiment, when a drying operation signal is input through a key panel (not shown) by a user, the controller 10 controls the first and second gas valve driving units 50, 60 to turn-on the first and second gas valves. Further, the controller 10 controls the proportional control valve driving unit 70 to turn-on the proportional control valve in S10. In this case, the proportional control valve is opened to a maximum opening degree. Additionally, the gas combustor 20 is controlled to burn a gas.

Here, the controller 10 determines whether the temperature of the inlet detected by the inlet temperature sensor 30 is greater than or equal to an inlet control temperature, in S20.

If the temperature of the inlet is less than the inlet control temperature, it is checked whether the temperature of the outlet detected by the outlet temperature sensor 40 is greater than or equal to the valve-closing control temperature, in S50.

If the temperature of the outlet is less than the valve-closing control temperature, the process proceeds again to the operation in S20 to determine whether the temperature of the inlet is greater than or equal to the inlet control temperature, while maintaining the current state.

On the other hand, if the temperature of the outlet detected by the outlet temperature sensor 40 is greater than or equal to the valve-closing control temperature, the first and second gas valve driving units 50, 60 and the proportional control valve driving unit 70 are controlled to turn-off the first and second gas valves and the proportional control valve in S52, thereby blocking the gas from being supplied into the gas combustor 20. Blocking of the gas supply is performed to prevent laundry inside the drum from being damaged due to a high temperature of hot air at the outlet of the drum, despite a low temperature of the hot air at the inlet.

If it is determined in S20 that the temperature of the inlet is greater than or equal to the inlet control temperature, it is determined whether the temperature of the outlet detected by the outlet temperature sensor 40 is greater than or equal to the valve-closing control temperature, in S30.

As such, according to the embodiment of this invention, it is determined whether the temperature of the outlet is greater than or equal to the valve-closing control temperature either in the case where the temperature of the inlet is greater than or equal to the inlet control temperature or in the case where the temperature of the inlet is less than the inlet control temperature. This is because the temperature of the outlet can be greater than or equal to the valve-closing control temperature or the temperature of the outlet can be less than the valve-closing control temperature, regardless of the temperature of the inlet.

In other words, if the laundry in the drum contains a lot of moisture, the temperature of the outlet can be low despite a high temperature of the inlet. Further, if the laundry in the drum contains a small amount of moisture, the temperature of the outlet can be high despite a low temperature of the inlet.

On the other hand, if the temperature of the outlet is greater than or equal to the valve-closing control temperature, the temperatures of the inlet and the outlet are excessively high, and thus, the first and second gas valve driving units 50, 60 and the proportional control valve driving unit 70 are controlled to turn-off the first and second gas valves and the proportional control valve in S60. As a result, the gas is blocked from being supplied into the gas combustor 20.

Particularly, the valve-closing control temperature is variously determined according to user settings, such as drying period, kind and amount of laundry, or the like. The user settings may also be applied to a valve-opening control temperature described below.

On the other hand, if it is determined in S30 that the temperature of the outlet detected by the outlet temperature sensor 40 is less than the valve-closing control temperature, the proportional control valve driving unit 70 is controlled to reduce the amount of gas supplied into the gas combustor 20 by lowering the opening degree of the proportional control valve driving unit 70 by a preset step, for example, by one step, in S40, followed by monitoring in S42 whether a retardation time has elapsed.

Here, the reason for lowering the opening degree of the proportional control valve is that the laundry located near the inlet can be damaged due to excessively hot air when the temperature of the inlet is greater than or equal to the inlet control temperature, even in the case where the temperature of the outlet is less than the valve-closing control temperature.

Then, if the retardation time has elapsed, the process returns again to the operation in S20 to determine whether the temperature of the inlet is greater than or equal to the inlet control temperature, followed by the subsequent operations described above.

In other words, whenever the temperature of the inlet is greater than or equal to the inlet control temperature and the temperature of the outlet is less than the valve-closing control temperature, the opening degree of the proportional control valve is lowered by one step at a time so that the amount of gas supplied into the gas combustor can be lowered, thereby preventing the temperature of the inlet from being excessively increased.

On the other hand, after the first and second gas valve driving units 50, 60 and the proportional control valve driving unit 70 are controlled to turn-off the first and second gas valves and the proportional control valve in S60 and S52 by determining that the temperature of the outlet is greater than or equal to the valve-closing control temperature, it is determined whether the temperature of the outlet detected by the outlet temperature sensor 40 is less than or equal to a valve-opening control temperature, in S70. At this time, if the temperature of the outlet exceeds the valve-opening control temperature, the operation of determining whether the temperature of the outlet detected by the outlet temperature sensor 40 is less than or equal to the valve-opening control temperature is repeated.

During this operation, since the gas is not supplied into the gas combustor 20, the hot air is not supplied into the drum. Therefore, the temperature of the outlet is gradually decreased and finally reaches the valve-opening control temperature or less.

As a result, when the temperature of the outlet reaches the valve-opening control temperature or less, the first and second gas valve driving units 50, 60 and the proportional control valve driving unit 70 are controlled to turn-on the first and second gas valves and the proportional control valve in S80. In this case, the proportional control valve driving unit 70 opens the proportional control valve to a final opening degree which is an opening degree in a final state when the proportional control valve is turned off.

Then, the process returns to the operation of determining whether the temperature of the inlet is greater than or equal to the inlet control temperature, followed by the subsequent operations described above.

In the above process, for example, when the drying operation is performed exceeding a predetermined drying period or when a condition for stopping the drying operation, such as a drying degree of laundry or the like, is satisfied, the first and second gas valve driving units 50, 60 and the proportional control valve driving unit 70 are controlled to block gas supply into the gas combustor 20 and the rotation of the drum is stopped to terminate the drying operation. Since this operation can be easily performed by a person having ordinary knowledge in the art, a detailed description thereof will be omitted herein.

As such, in the method of controlling the gas valve of the dryer according to this embodiment, the gas valve is controlled based not only on the temperature of the outlet, but also on the temperature of the inlet through which hot air is supplied into the drum, so that the drying temperature can be maintained at a preset temperature even in the case where different amounts of gases such as liquefied petroleum gas (LPG) and liquefied natural gas (LNG) are used to generate the same heat amount through combustion.

As apparent from the above description, according to one embodiment of the present invention, a user can easily control the heat amount of the dryer and maintain a desired drying temperature of the dryer regardless of the kind of gas.

Further, according to one embodiment of the present invention, it is possible to prevent laundry from being damaged by hot air supplied into an inlet of the dryer.

Although some embodiment have been provided to illustrate the present invention in conjunction with the drawings, it will be apparent to those skilled in the art that the embodiments are given by way of illustration only, and that various modifications and equivalent embodiments can be made without departing from the spirit and scope of the present invention. Accordingly, the scope of the present invention should be limited only by the accompanying claims.

What is claimed is:

1. A method of controlling a gas valve of a dryer, comprising:
   detecting temperature of hot air supplied into a drum;
   detecting the temperature of the hot air discharged outside the drum; and
   controlling a gas valve of a gas combustor according to the temperature of the hot air supplied into the drum and the temperature of the hot air discharged outside the drum, wherein
   when the temperature of the hot air supplied into the drum is greater than or equal to an inlet control temperature and the temperature of the hot air discharged outside the drum is less than a valve-closing control temperature, an open degree of the gas valve is lowered, and
   when the temperature of the hot air supplied into the drum is greater than or equal to the inlet control temperature and the temperature of the hot air discharged outside the drum is greater than or equal to the valve-closing control temperature, the gas valve is turned-off.

2. The method according to claim 1, wherein the gas valve proportionally controls an amount of gas.

3. The method according to claim 2, wherein whenever the temperature of the hot air supplied into the drum is greater than or equal to the inlet control temperature and the temperature of the hot air discharged outside the drum is less than the valve-closing control temperature, an open degree of the gas valve is lowered by a preset step at each time and is then maintained for a retardation time.

4. The method according to claim 1, wherein when the temperature of the hot air discharged outside the drum is less than or equal to a valve-opening control temperature after the gas valve is turned-off, the gas valve is turned-on.

5. The method according to claim 4, wherein the gas valve is open to a final open degree at the time of turning-off the gas valve.

6. The method according to claim 2, wherein when the temperature of the hot air discharged outside the drum is greater than or equal to the valve-closing control temperature, the gas valve is turned-off.

7. The method according to claim 6, wherein when the temperature of the hot air discharged outside the drum is less than or equal to a valve-opening control temperature after the gas valve is turned-off, the gas valve is turned-on.

8. The method according to claim 7, wherein the gas valve is open to a final open degree at the time of turning-off the gas valve.

* * * * *